(12) United States Patent
Onodera et al.

(10) Patent No.: US 10,809,950 B2
(45) Date of Patent: Oct. 20, 2020

(54) INFORMATION PROCESSING APPARATUS, CONTROL METHOD THEREFOR, NON-TRANSITORY COMPUTER-READABLE MEDIUM, AND INFORMATION PROCESSING SYSTEM

(71) Applicant: CANON DENSHI KABUSHIKI KAISHA, Saitama (JP)

(72) Inventors: Sousuke Onodera, Tokyo (JP); Hiroki Miura, Chiba-ken (JP); Taketo Ochiai, Tokyo (JP); Hirotaka Watanabe, Kanagawa-ken (JP); Kazuki Takano, Saitama-ken (JP); Hiroki Arai, Tokyo (JP); Dayon Kou, Tokyo (JP); Yuantian Wei, Tokyo (JP)

(73) Assignee: CANON DENSHI KABUSHIKI KAISHA, Chichibu-Shi (JP)

( * ) Notice: Subject to any disclaimer, the term of this patent is extended or adjusted under 35 U.S.C. 154(b) by 0 days.

(21) Appl. No.: 16/733,118

(22) Filed: Jan. 2, 2020

(65) Prior Publication Data
US 2020/0192614 A1    Jun. 18, 2020

Related U.S. Application Data

(63) Continuation of application No. 16/422,729, filed on May 24, 2019, which is a continuation of application No. PCT/JP2017/040722, filed on Nov. 13, 2017.

(30) Foreign Application Priority Data

Nov. 30, 2016  (JP) .................................. 2016-233612

(51) Int. Cl.
*H04N 1/00*       (2006.01)
*G06F 3/12*       (2006.01)
(Continued)

(52) U.S. Cl.
CPC .......... *G06F 3/1232* (2013.01); *G06F 3/1203* (2013.01); *G06F 3/1227* (2013.01);
(Continued)

(58) Field of Classification Search
CPC .... G06F 3/1232; G06F 3/1227; G06F 3/1231; G06F 3/1236; G06F 21/44; G06F 3/1203; G06F 13/00; H04L 67/22; H04N 1/00
(Continued)

(56) References Cited

U.S. PATENT DOCUMENTS 8,810,837 B2   8/2014  Ikeda
9,137,395 B2   9/2015  Matsumoto
(Continued)

FOREIGN PATENT DOCUMENTS

JP    2007-87327    4/2007
JP    2012-15979    1/2012
(Continued)

OTHER PUBLICATIONS

Kazuma Andoh, Zukai! Hisshuu tekunonojii, Nikkei Systems, Nikkei Business Publications, Inc., Jan. 26, 2011, vol. 214, p. 70. (Partial English-language translation included.).
(Continued)

*Primary Examiner* — Saeid Ebrahimi Dehkordy
(74) *Attorney, Agent, or Firm* — Venable LLP

(57) ABSTRACT

The web server program causes the information processing apparatus to function as: a reception unit that receives a request from a web application executed on the web browser; an acquisition unit configured to acquire, from the request, information about a domain of the web application executed on the web browser; a determination unit that determines whether or not to permit communication with the web application executed on the web browser, based on the domain indicated in the information acquired by the acqui-
(Continued)

sition unit; and a transmission unit that transmits a response to the web browser based on the result of determination of the determination unit, wherein the web server program communicates with an external apparatus connected to a network, and acquires, from the external apparatus, information used for authentication or authorization by the external apparatus.

8 Claims, 13 Drawing Sheets

(51) Int. Cl.
   *H04L 29/08* (2006.01)
   *G06F 21/44* (2013.01)
   *G06F 13/00* (2006.01)

(52) U.S. Cl.
   CPC .......... *G06F 3/1231* (2013.01); *G06F 3/1236* (2013.01); *G06F 13/00* (2013.01); *G06F 21/44* (2013.01); *H04L 67/22* (2013.01); *H04N 1/00* (2013.01)

(58) Field of Classification Search
   USPC ........................................................ 358/1.15
   See application file for complete search history.

(56) References Cited

U.S. PATENT DOCUMENTS

| | | | |
|---|---|---|---|
| 9,241,030 B2 | 1/2016 | Mayers | |
| 9,396,315 B2 | 7/2016 | Bae | |
| 9,442,682 B2 | 9/2016 | Osuki | |
| 9,538,255 B2 | 1/2017 | Isozaki | |
| 9,542,551 B2 | 1/2017 | Hosoda | |
| 9,686,264 B2 | 6/2017 | Banno | |
| 2004/0098476 A1* | 5/2004 | Kawase | G06Q 10/10 709/223 |
| 2011/0154462 A1 | 6/2011 | Charbonnier | |
| 2012/0005336 A1 | 1/2012 | Ooba | |
| 2012/0226990 A1 | 9/2012 | Nakashima | |
| 2013/0269019 A1 | 10/2013 | Garmark | |
| 2014/0289360 A1 | 9/2014 | Mahkovec | |
| 2015/0143467 A1 | 5/2015 | Hebert | |
| 2015/0244783 A1 | 8/2015 | Mayers | |
| 2016/0094534 A1 | 3/2016 | Banno | |
| 2017/0180463 A1 | 6/2017 | Wang | |

FOREIGN PATENT DOCUMENTS

| | | |
|---|---|---|
| JP | 2012-147335 | 8/2012 |
| JP | 2012-185650 | 9/2012 |
| JP | 2014-106581 | 6/2014 |
| JP | 2014-192638 | 10/2014 |
| JP | 2015-19125 | 1/2015 |
| JP | 2015-130120 | 7/2015 |
| JP | 2016-71561 | 5/2016 |
| JP | 2016-518653 | 6/2016 |
| JP | 2016-148919 | 8/2016 |
| WO | 2014/153540 | 9/2014 |
| WO | 2016/034070 | 10/2016 |

OTHER PUBLICATIONS

Japanese Office Action dated Jan. 31, 2019 during prosecution of related Japanese application No. 2018-237605. (English-language machine translation included.).
Japanese Office Action dated Feb. 19, 2019 during prosecution of related Japanese application No. 2018-549277. (English-language machine translation included.).
Japanese Office Action dated Nov. 28, 2018 during prosecution of related Japanese application No. 2018-549277. (English-language machine translation included.).
Japanese Office Action dated Jun. 24, 2019 during prosecution of related Japanese application No. 2018-549277 (English-language machine translation included).
Japanese Office Action dated May 31, 2019 during prosecution of related Japanese application No. 2018-237605 (English-language machine translation included).
European Search Report dated Jul. 14, 2020 issued in counterpart European Application No. 17876254.8.

* cited by examiner

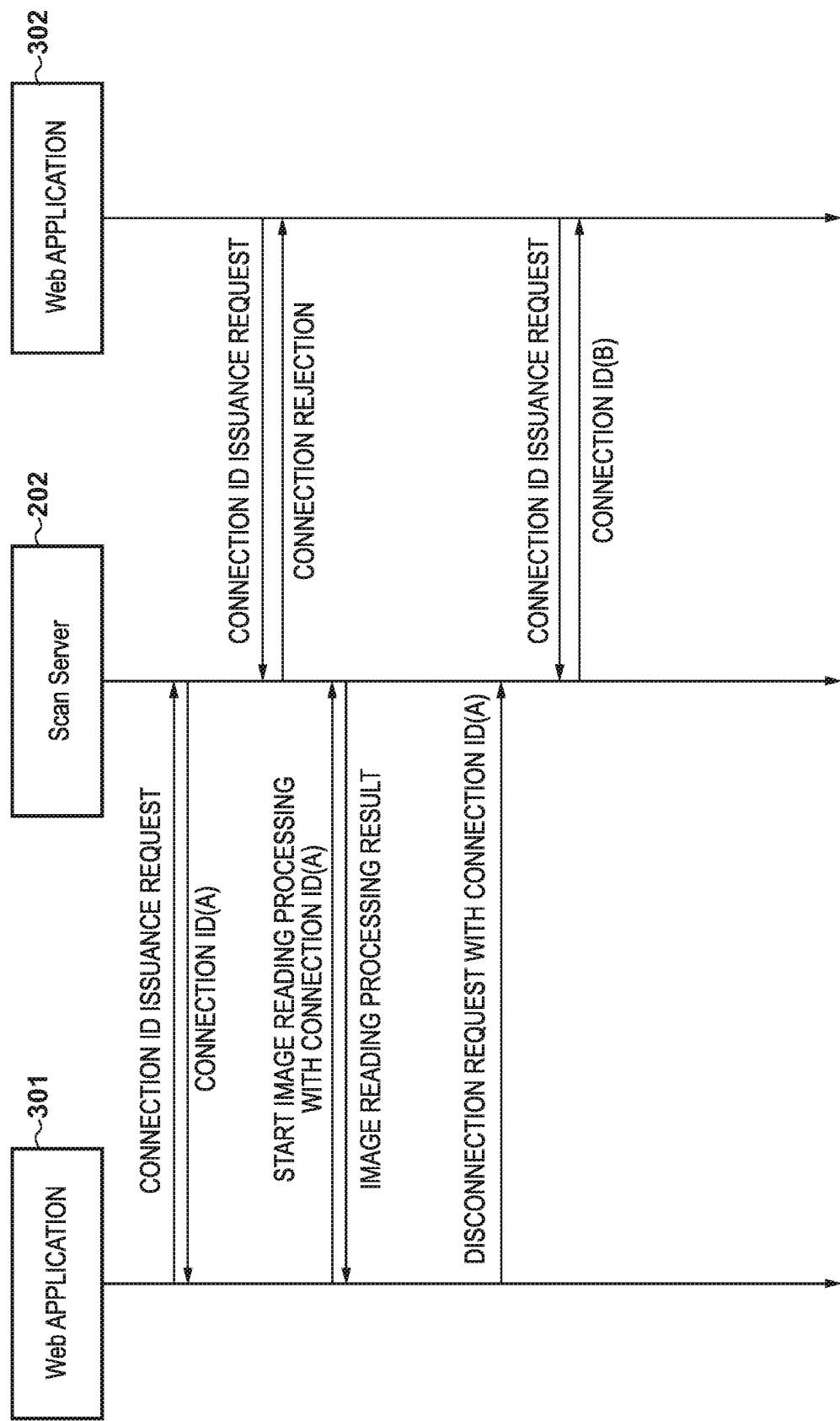

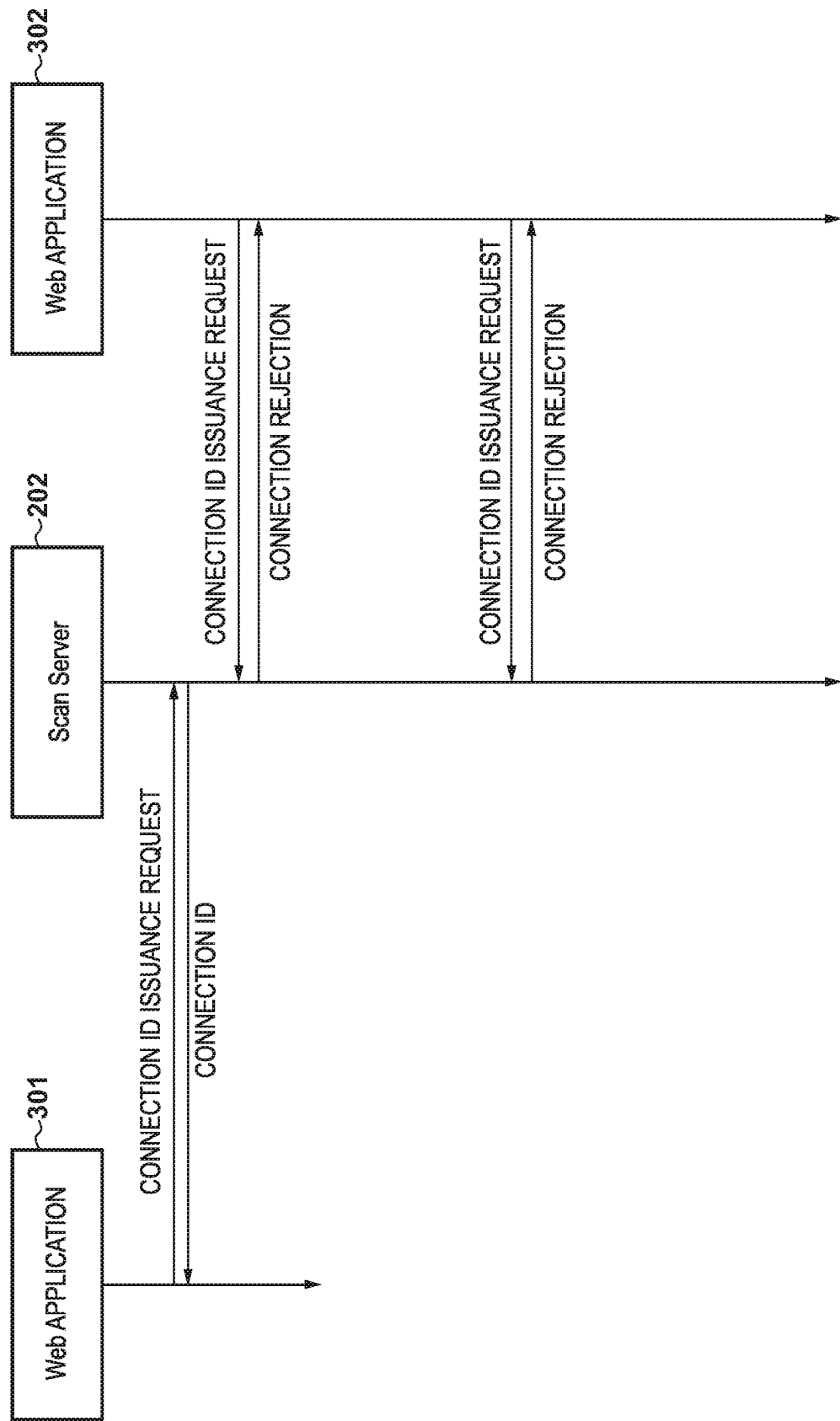

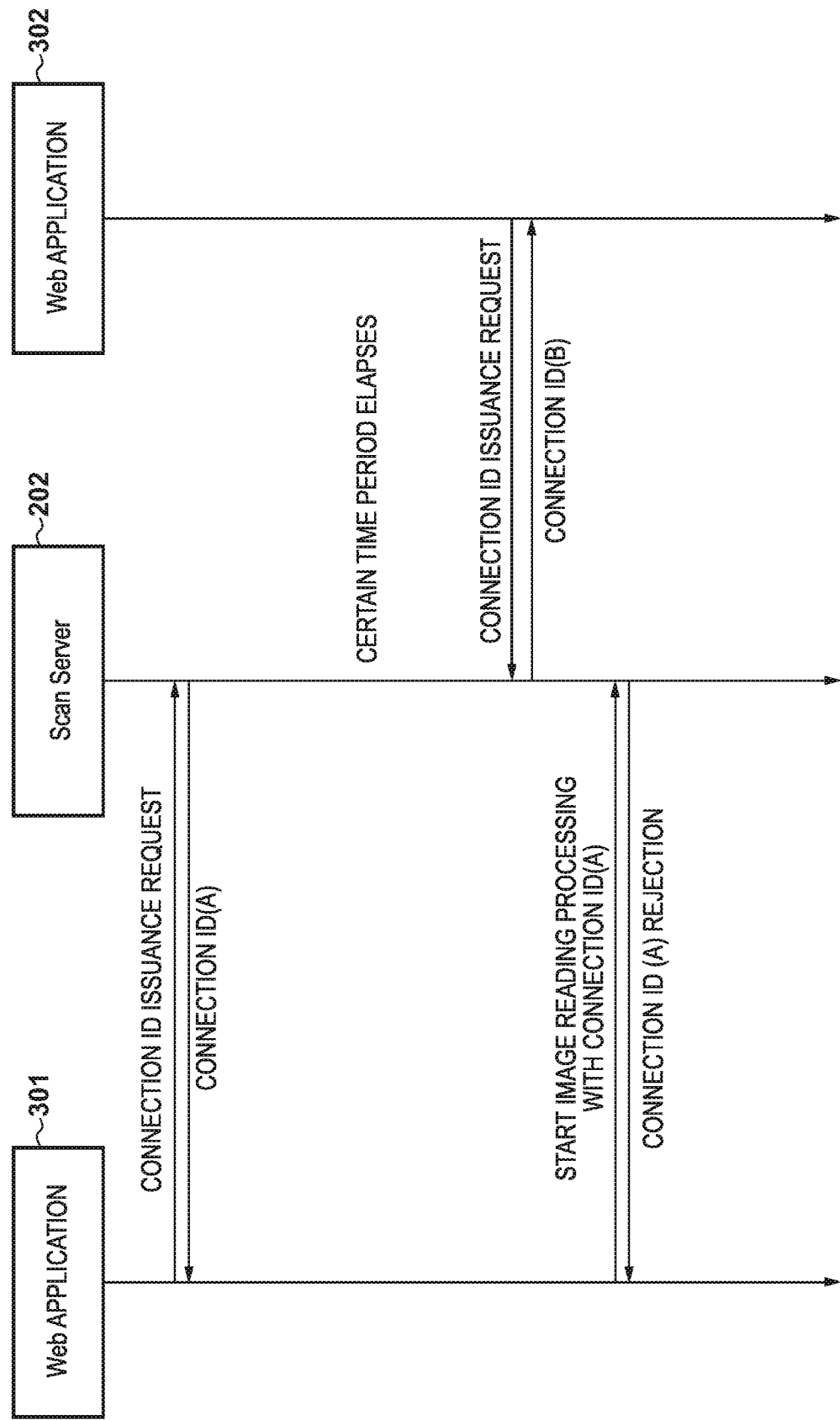

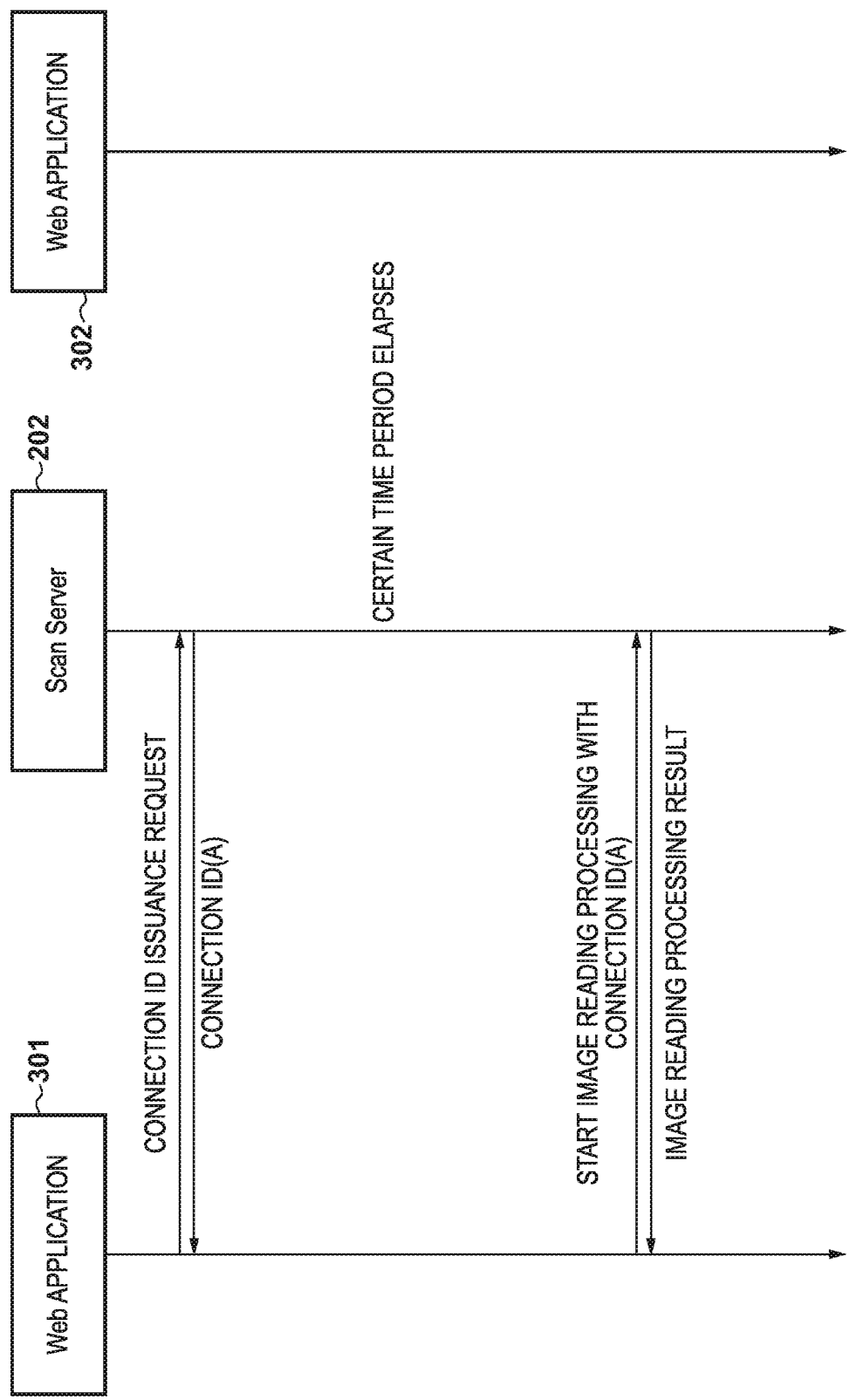

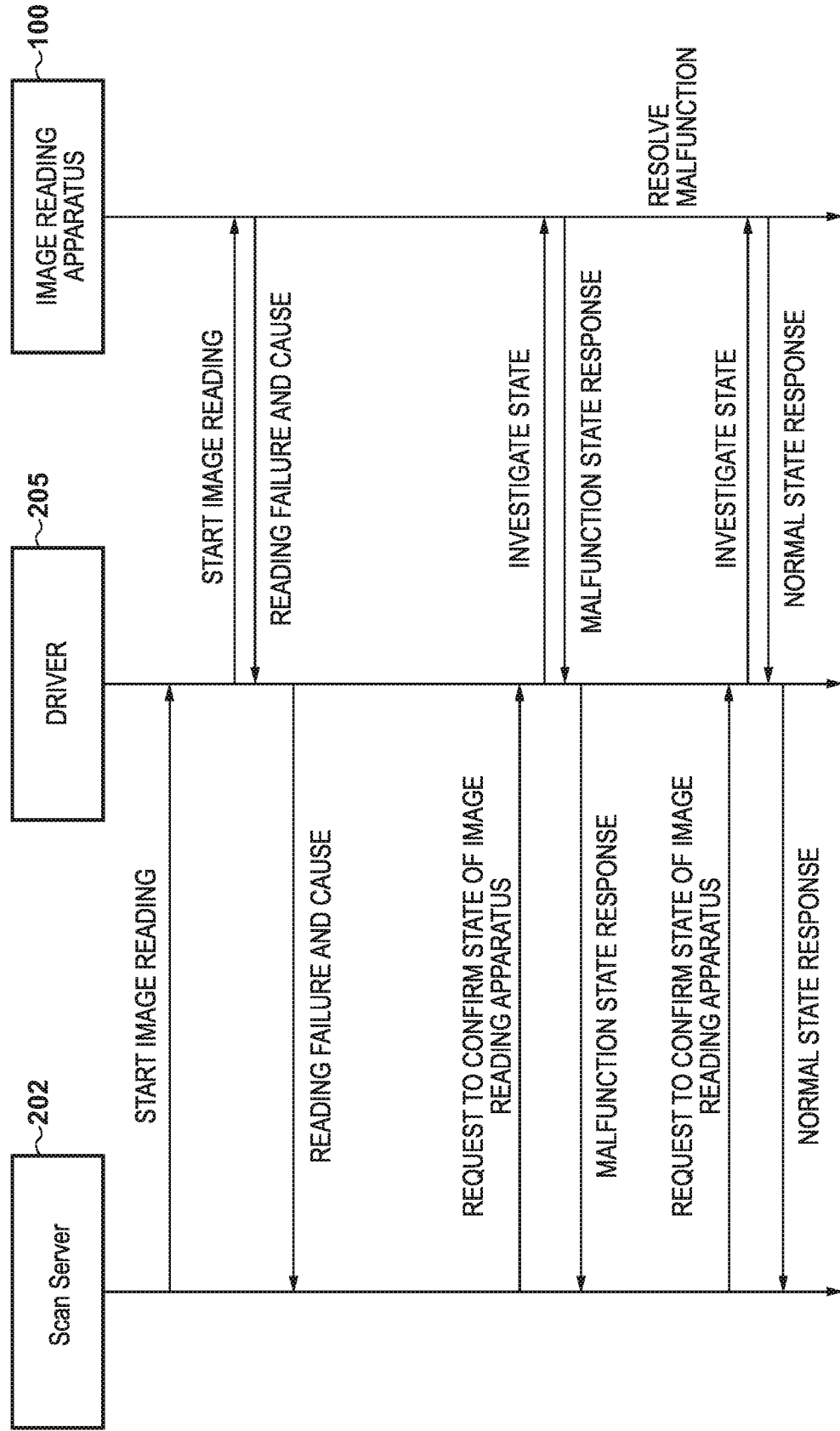

INFORMATION PROCESSING APPARATUS, CONTROL METHOD THEREFOR, NON-TRANSITORY COMPUTER-READABLE MEDIUM, AND INFORMATION PROCESSING SYSTEM

CROSS-REFERENCE TO RELATED APPLICATIONS

This application is a continuation of U.S. application Ser. No. 16/422,729, filed on May 24, 2019, which is a continuation of International Patent Application No. PCT/JP2017/040722 filed on Nov. 13, 2017, which claims priority to and the benefit of Japanese Patent Application No. 2016-233612 filed on Nov. 30, 2016, the entire disclosures of which are incorporated herein by reference.

TECHNICAL FIELD

The present invention relates to an information processing apparatus, a control method therefor, a non-transitory computer-readable medium, and an information processing system.

BACKGROUND ART

Creating an application for reading images with an image reading apparatus (for example, a scanner) operating at a user terminal has required incorporating a software development kit that supports the image reading apparatus into a program and developing a desktop application operating at a user terminal. On the other hand, recent business applications in companies are often realized as a plurality of web applications operating on a web browser. Consequently, to use an image reading apparatus, for example, it is necessary to use both an application for operating the image reading apparatus and a business application. Using the two applications poses problems such as reduced efficiency due to divided jobs, and effort required to be familiar with both applications. To solve these problems, patent literature 1 describes a technique of reading images by operating an image reading apparatus via a web browser.

CITATION LIST

Patent Literature

PTL1: U.S. Pat. No. 9,241,030

SUMMARY OF INVENTION

Technical Problem

While patent literature 1 enables image reading via a web browser, a web storage system in which read images are to be stored may reside in a domain different from the domain of a web application service providing system (cross domain). Generally, various web browsers serving as an operational environment for web applications implement a function of prohibiting JavaScript (R) included in a web application from obtaining data by transmitting a request to domains other than a domain in which the web application resides (prohibition of cross-domain requests).

To address this cross-domain request prohibition function, patent literature 1 describes a method of obtaining data using JSONP (JavaScript (R) Object Notation with Padding: a mechanism of obtaining cross-domain data using a script tag). However, this mechanism is inappropriate as a format for handling sensitive information because a server's endpoint is always exposed.

Another measure for the cross-domain request prohibition function is XMLHttpRequest Level 2, which is specifications allowing cross-domain requests. In this case, CORS (Cross-Origin Resource Sharing) specifications must be followed. That is, in order for a request transmission to be permitted, a web storage service (i.e., a destination server) in a domain different from the domain of a web application service providing system needs to support CORS and to set the domain of the web application service providing system to be permitted. Therefore, cross-domain requests cannot be addressed only on the web-application side, i.e., the web application service providing system.

The present invention has been made in the light of the above problems, and an object thereof is to enable highly secure and user-convenient cross-domain communications.

Solution to Problem

An information processing apparatus according to the present invention is an information processing apparatus having a web server program that listens with a host name as a localhost, and a web browser, wherein the web server program causes the information processing apparatus to function as: a reception unit configured to receive a request from a web application executed on the web browser; an acquisition unit configured to acquire, from the request, information about a domain of the web application executed on the web browser; a determination unit configured to determine whether or not to permit communication with the web application executed on the web browser, based on the domain indicated in the information acquired by the acquisition unit; and a transmission unit configured to transmit a response to the web browser based on the result of determination of the determination unit, wherein the web server program communicates with an external apparatus connected to a network, and acquires, from the external apparatus, information used when authenticating or authorizing by the external apparatus.

Advantageous Effects of Invention

According to the present invention, highly secure and user-convenient cross-domain communications can be enabled.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are included in and form part of the specification, illustrate embodiments of the present invention and are used to explain the principles of the present invention in conjunction with the description thereof.

FIG. 9 is a diagram illustrating an example in which a web application 301 performs image reading processing using a lock function;

FIG. 10 is a diagram illustrating an example in which the Scan Server 202 remains occupied in the lock function;

FIG. 11 is a diagram illustrating a process where an issued connection ID can be discarded after a certain time period in the lock function;

FIG. 12 is a diagram illustrating an exemplary process where an issued connection ID can be discarded after a certain time period in the lock function; and FIG. 13 is a diagram illustrating an exemplary process where a malfunction occurs in the image reading processing.

DESCRIPTION OF EMBODIMENTS

Embodiments for implementing the present invention will be described with reference to the drawings. The present invention is not limited to the configurations described below but may employ various configurations within its technical concept. For example, part of the configurations described below may be omitted, be replaced with other configurations, or include other configurations.

Figure 2:
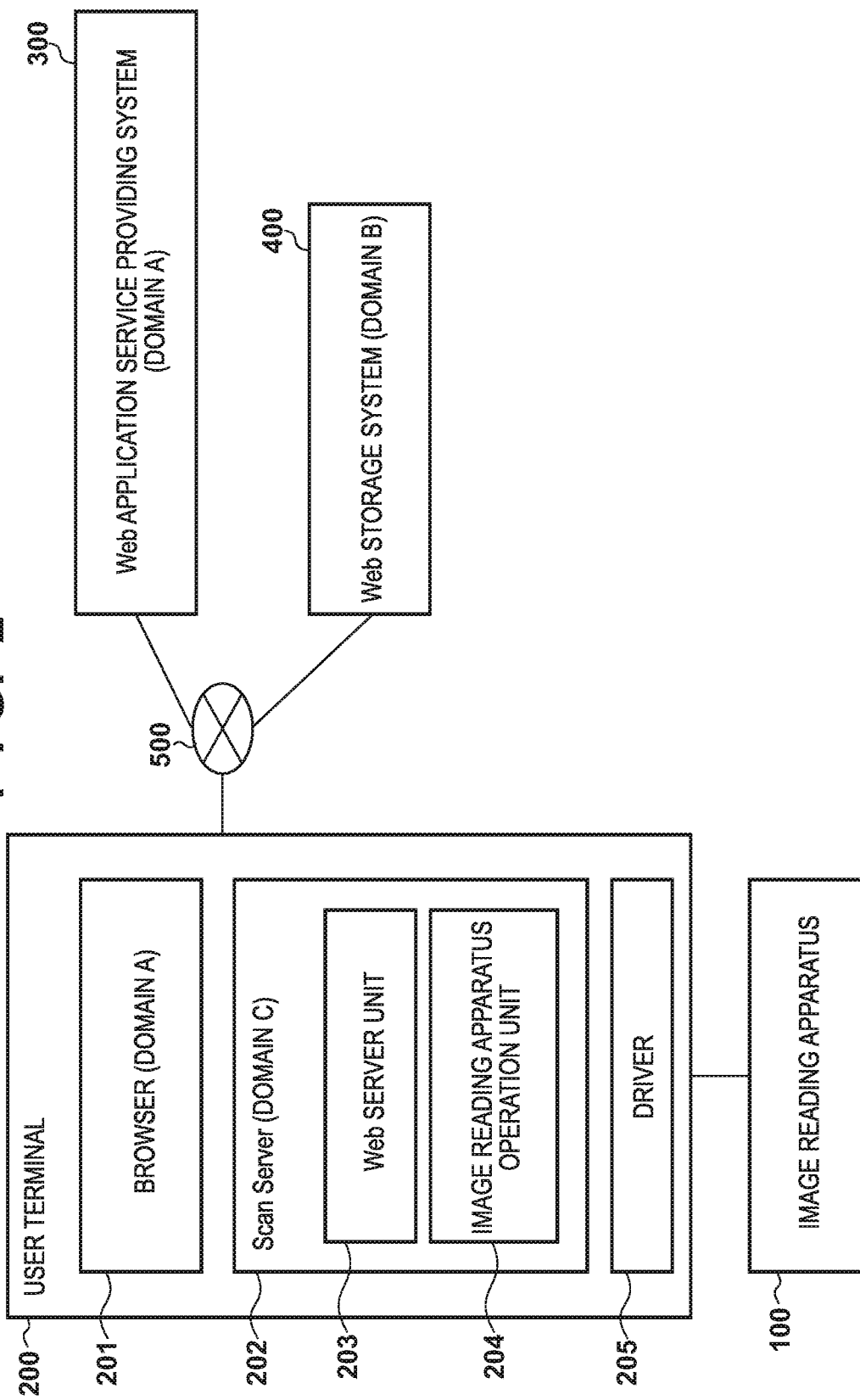
FIG. 2 is a block diagram illustrating an exemplary functional configuration of a system according to an embodiment.

A system according to an embodiment will be described with reference to FIG. 2. As illustrated in FIG. 2, in the system according to this embodiment, a user terminal (an information processing apparatus) 200, a web application service providing system 300, and a web storage system 400 (an external apparatus) are interconnected via a network 500 such as the Internet or an intranet. It is to be noted that multiple user terminals 200, web application service providing systems 300, and web storage systems 400 may be interconnected. In the following description, "domain A" denotes the domain of the web application service providing system 300 and a browser 201, "domain B" denotes the domain of the web storage system 400, and "domain C" denotes the domain of a Scan Server 202, as an example.

An image reading apparatus (a device apparatus) 100 is connected to the user terminal 200. The connection to the user terminal 200 may be made with wired communication (e.g., a USB cable) as well as wireless communication. The image reading apparatus 100 may also be incorporated in the user terminal 200.

While the image reading apparatus will be described as an exemplary device apparatus in the following description, this is not limitation. Rather, the device apparatus may be an imaging apparatus (e.g., a camera), an image forming apparatus (e.g., a multifunction peripheral), an electric appliance (e.g., a refrigerator), a sensor (e.g., a thermometer), or an automobile. For an imaging apparatus, shot image information or audio information will be transmitted. For an electric appliance, information about the state of the electric appliance itself will be transmitted. For a sensor, information sensable by the sensor will be transmitted. For an automobile, information such as the mileage or location will be transmitted. Multiple kinds of device apparatuses, rather than any one device apparatus, may be connected to the user terminal 200.

<Configuration of Image Reading Apparatus>

Figure 1:
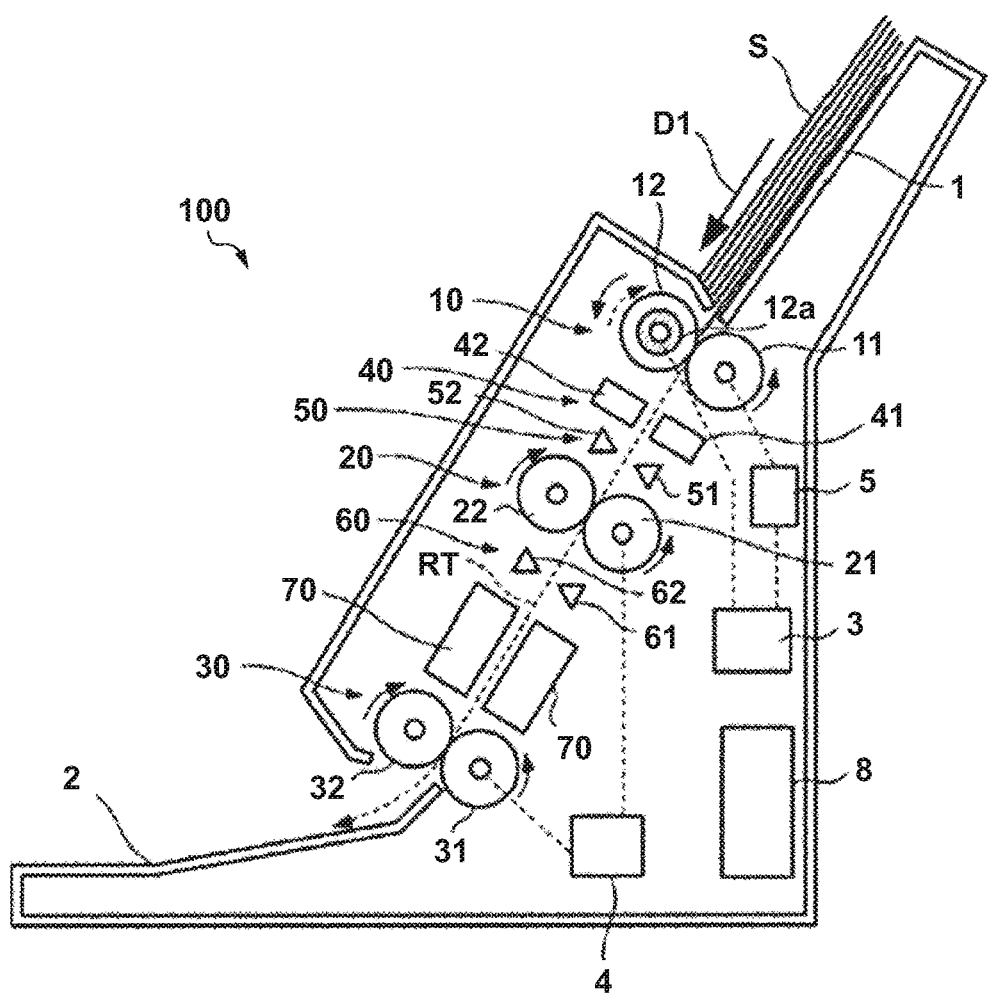
FIG. 1 is a schematic diagram of an image reading apparatus 100 according to an embodiment.

FIG. 1 is a schematic diagram of the image reading apparatus 100 according to an embodiment.

The image reading apparatus 100 is an apparatus that transports one or more carrier media S stacked on a placement table 1 into the apparatus one by one along a path RT to read their images and ejects the carrier media S onto an ejection tray 2. For example, the carrier media S to be read are sheets of OA paper, checks, vouchers, or cards, and the sheets may be thick or thin. Examples of cards may include insurance cards, drivers' licenses, and credit cards. The carrier media S also include books such as passports.

A first transport unit 10 is provided as a feeding mechanism for feeding the carrier media S along the path RT. In this embodiment, the first transport unit 10 includes a feed roller 11 and a separation roller 12 disposed opposite the feed roller 11, and successively transports the carrier media S on the placement table 1 one by one in a transport direction Dl. Driving forces are transmitted to the feed roller 11 from a driving unit 3 such as a motor via a transmission unit 5, so that the feed roller 11 is rotationally driven in a direction indicated by an arrow in the figure (the forward direction to transport the carrier media S along the path RT). The transmission unit 5, which is an electromagnetic clutch for example, transmits and shuts off driving forces from the driving unit 3 to the feed roller 11.

For example, in this embodiment, the transmission unit 5 connecting the driving unit 3 and the feed roller 11 transmits driving forces in normal mode, and shuts off driving forces in reversely transporting the carrier media S. When transmission of driving forces is shut off by the transmission unit 5, the feed roller 11 becomes freely rotatable. The transmission unit 5 as above need not be provided if the feed roller 11 is driven only in one direction.

The separation roller 12 disposed opposite the feed roller 11 is a roller for separating each carrier medium S and is in pressure-contact with the feed roller 11 at a constant pressure. To maintain this pressure-contact state, the separation roller 12 is swingably provided and configured to be biased toward the feed roller 11. Driving forces are transmitted to the separation roller 12 from the driving unit 3 via a torque limiter 12a, so that the separation roller 12 is rotationally driven in a direction indicated by a solid arrow (the direction opposite the forward direction of the feed roller 11).

Since the transmission of driving forces to the separation roller 12 is restricted by the torque limiter 12a, the separation roller 12 rotates in a direction dragged by the feed roller 11 (the direction indicated by a dashed arrow) while in contact with the feed roller 11. Therefore, when multiple carrier media S are transported to the pressure-contact point between the feed roller 11 and the separation roller 12, the carrier media S except one of them are blocked so as not to be transported downstream.

While the separation roller 12 and the feed roller 11 form a separation mechanism in this embodiment, such a separation mechanism may not be necessarily provided. Rather, the feeding mechanism may simply successively feed the carrier media S one by one to the path RT. If the separation mechanism is provided, a separation pad that applies friction to the carrier media S may be disposed in pressure-contact with the feed roller 11, instead of a component like the separation roller 121, thereby realizing a similar separation function.

A second transport unit 20 is a transport mechanism downstream in the transport direction from the first transport unit 10. The second transport unit 20 includes a driving roller 21 and a driven roller 22 driven by the driving roller 21, and transports the carrier media S transported from the first transport unit 10 downstream. Driving forces are transmitted to the driving roller 21 from a driving unit 4 such as a motor, so that the driving roller 21 is rotationally driven in a direction indicated by an arrow in the figure. The driven roller 22 is in pressure-contact with the driving roller 21 at a constant pressure and dragged by the driving roller 21. The driven roller 22 may be biased toward the driving roller 21 by a biasing unit (not shown) such as a spring.

A third transport unit 30 resides downstream in the transport direction from the second transport unit 20. The third transport unit 30 includes a driving roller 31 and a driven roller 32 driven by the driving roller 31, and transports the carrier media S transported from the second transport unit 20 onto the ejection tray 2. That is, the third transport unit 30 functions as an ejection mechanism. Driving forces are transmitted to the driving roller 31 from the driving unit 4 such as a motor, so that the driving roller 31 is rotationally driven in a direction indicated by an arrow in the figure. The driven roller 32 is in pressure-contact with the driving roller 31 at a constant pressure and dragged by the driving roller 31. The driven roller 32 may be biased toward the driving roller 31 by a biasing unit (not shown) such as a spring.

In the image reading apparatus 100 in this embodiment, image reading units 70 disposed between the second transport unit 20 and the third transport unit 30 reads images, so that the second transport unit 20 and the third transport unit 30 transport the carrier media S at a constant speed. Keeping the transport speed not below the transport speed of the first transport unit 10 can ensure avoidance of a situation in which the following carrier medium S catches up with the preceding carrier medium S. For example, in this embodiment, the speed of the carrier media S transported by the second transport unit 20 and the third transport unit 30 is controlled to be above the speed of the carrier media S transported by the first transport unit 10.

If the speed of the carrier media S transported by the second transport unit 20 and the third transport unit 30 is controlled to be equal to the speed of the carrier media S transported by the first transport unit 10, a minimum required interval can still be provided between the preceding carrier medium S and the following carrier medium S by controlling the driving unit 3 to intermittently delay the start of feeding the following carrier medium S.

A multi-feed detection sensor 40 disposed between the first transport unit 10 and the second transport unit 20 is an example of a detection sensor for detecting that several carrier media S (such as paper) sticking together have passed through the first transport unit 10 due to e.g., static electricity (i.e., multi-feed in which the media are transported in layers) (a sensor for detecting the behavior and state of the sheets). While various types of sensors are available as the multi-feed detection sensor 40, it is an ultrasonic sensor in this embodiment and includes an ultrasonic transmission unit 41 and a corresponding reception unit 42. The multi-feed detection sensor 40 detects multi-feed based on a principle that the carrier media S such as paper involve different amounts of attenuation of ultrasound passing therethrough in the cases where the carrier media S are transported in layers and where they are transported one by one.

A medium detection sensor 50, disposed downstream in the transport direction from the multi-feed detection sensor 40, is an example of an upstream detection sensor disposed upstream from the second transport unit 20 and downstream from the first transport unit 10 (a sensor for detecting the behavior and state of the sheets). The medium detection sensor 50 detects the position of each carrier medium S transported by the first transport unit 10, or more specifically, whether or not an edge of the carrier medium S has reached or passed a detection point of the medium detection sensor 50. While various types of sensors are available as the medium detection sensor 50, it is an optical sensor in this embodiment and includes a light emission unit 51 and a corresponding light reception unit 52. The medium detection sensor 50 detects the carrier medium S based on a principle that the received-light intensity (the amount of received light) changes upon reaching or passing of the carrier medium S.

In this embodiment, the above-described medium detection sensor 50 is provided near and downstream from the multi-feed detection sensor 40 such that, when the leading edge of the carrier medium S is detected by the medium detection sensor 50, the carrier medium S reaches the position allowing detection of multi-feed by the multi-feed detection sensor 40. The medium detection sensor 50 is not limited to the above-described optical sensor, but may be a sensor capable of sensing an edge of the carrier medium S (such as an image sensor) or a lever-shaped sensor projecting into the path RT.

A medium detection sensor 60, which is different from the medium detection sensor 50, is an example of a downstream detection sensor disposed upstream from the image reading units 70 and downstream from the second transport unit 20. The medium detection sensor 60 detects the position of each carrier medium S transported by the second transport unit 20. While various types of sensors are available as the medium detection sensor 60, it is an optical sensor in this embodiment as with the medium detection sensor 50, and includes a light emission unit 61 and a light reception unit 62. The medium detection sensor 60 detects the carrier medium S based on a principle that the received-light intensity (the amount of received light) changes upon reaching or passing of the carrier medium S. While the medium detection sensors 50 and 60 are respectively disposed on the upstream and downstream sides of the second transport unit 20 in the transport direction in this embodiment, a medium detection sensor may only be disposed on either one side.

The image reading units 70, residing downstream from the medium detection sensor 60, performs optical scanning, conversion into electric signals, and reading as image data, for example. The image reading units 70 include components such as a light source (such as an LED light), an image sensor, and a lens array. In this embodiment, the image reading units 70 are respectively disposed on both sides of the path RT to read the right side and the reverse side of the carrier medium S. Alternatively, one image reading unit 70 may be disposed only on one side of the path RT to read only one side of the carrier medium S. Also, while the image reading units 70 are arranged oppositely on both sides of the path RT in this embodiment, they may be displaced with some space in the direction of the path RT, for example.

Figure 3:
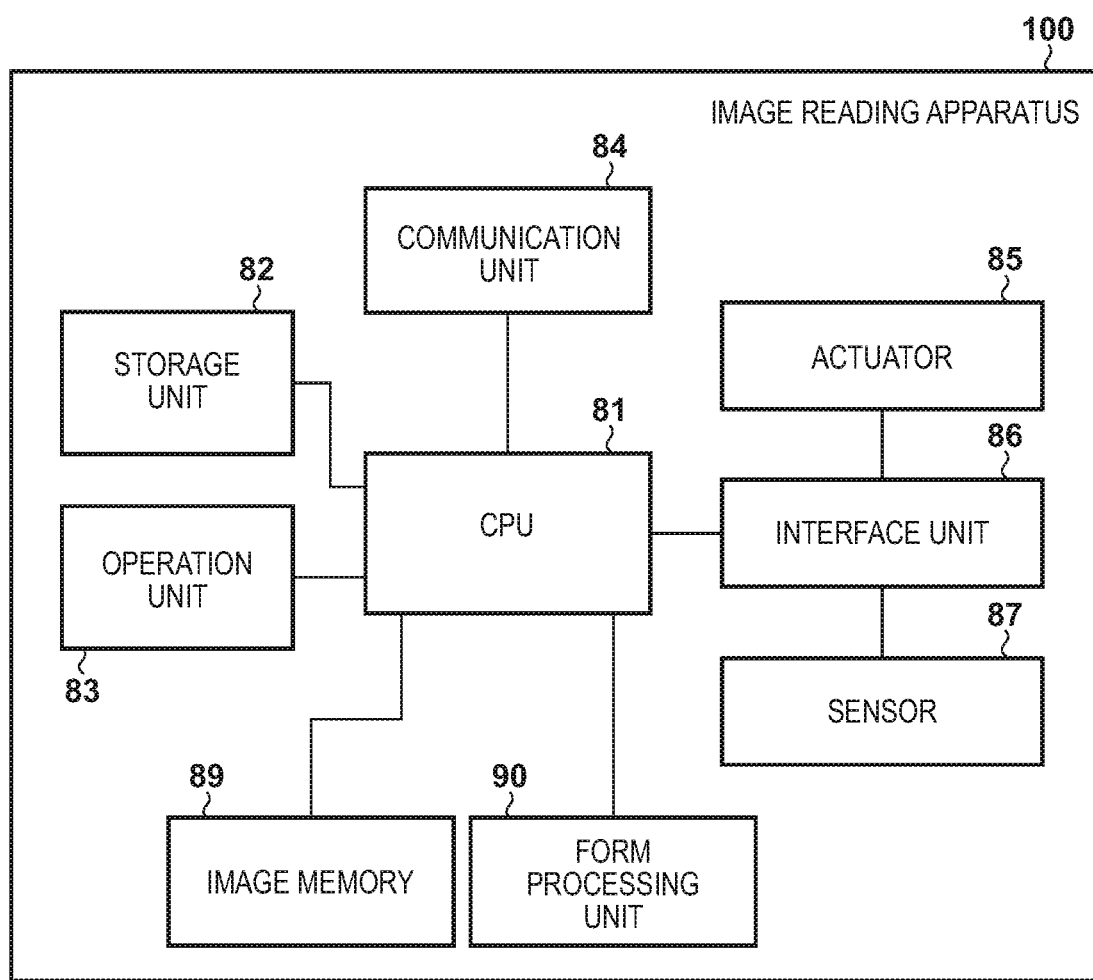
FIG. 3 is a block diagram illustrating a hardware configuration of the image reading apparatus 100 according to an embodiment.

The control unit 8 will be described with reference to FIG. 3. FIG. 3 is a block diagram of the control unit 8 of A, illustrating a hardware configuration of the image reading apparatus 100 according to an embodiment. The control unit 8 includes a CPU 81, a storage unit 82, an operation unit 83, a communication unit 84, an actuator 85, an interface unit 86, an image memory 89, and a form processing unit 90. The CPU 81 controls the entire image reading apparatus 100 by executing programs stored in the storage unit 82. The storage unit 82 includes a RAM and a ROM, for example. The operation unit 83 includes switches and a touch panel, for example, and receives user operations.

The communication unit 84 is an interface for communicating information with external apparatuses. If an external apparatus is assumed to be a PC (the user terminal), the communication unit 84 may be a USB interface or SCSI interface, for example. Besides these wired communication interfaces, the communication unit 84 may be a wireless communication interface or may include both wired and wireless communication interfaces. The interface unit 86 is an I/O interface for data input/output to/from the actuator 85 and a sensor 87. The actuator 85 includes the driving unit 3, the driving unit 4, and the transmission unit 5. The sensor 87 includes the multi-feed detection sensor 40, the medium detection sensors 50 and 60, and the image reading units 70. The image memory 89 saves image data read by the sensor 87. The form processing unit 90 performs optical text recognition processing on the image data saved in the image memory 89, recognizes the form type, and attaches information to the image data.

Basic operation of the image reading apparatus 100 will be described. For example, upon receiving an instruction to start image reading from the user terminal 200 to which the image reading apparatus 100 is connected, the control unit 8 starts driving the first to third transport units 10 to 30. The carrier media S stacked on the placement table 1 are transported one by one, starting with the carrier medium S at the bottom in the stack. As being transported, the carrier media S are checked for multi-feed by the multi-feed detection sensor 40, and if no occurrence of multi-feed is determined, the transport is continued. If the occurrence of multi-feed is determined, the transport may be stopped, or the first transport unit 10 may stop accepting subsequent carrier media S and the multi-fed carrier media S may be simply ejected.

At a time based on the result of detection by the medium detection sensor 60, the control unit 8 causes the image reading units 70 to start reading images on each carrier medium S transported by the second transport unit 20. The control unit 8 saves the read images in the image memory 89, performs optical text recognition processing on the saved image data, recognizes the form type, and attaches information to the image data. The control unit 8 then successively transmits the image data to the user terminal 200. The carrier medium S having its images read is ejected by the third transport unit 30 onto the ejection tray 2, and the image reading processing on that carrier medium S is completed.

<Configuration of User Terminal>

Figure 4:
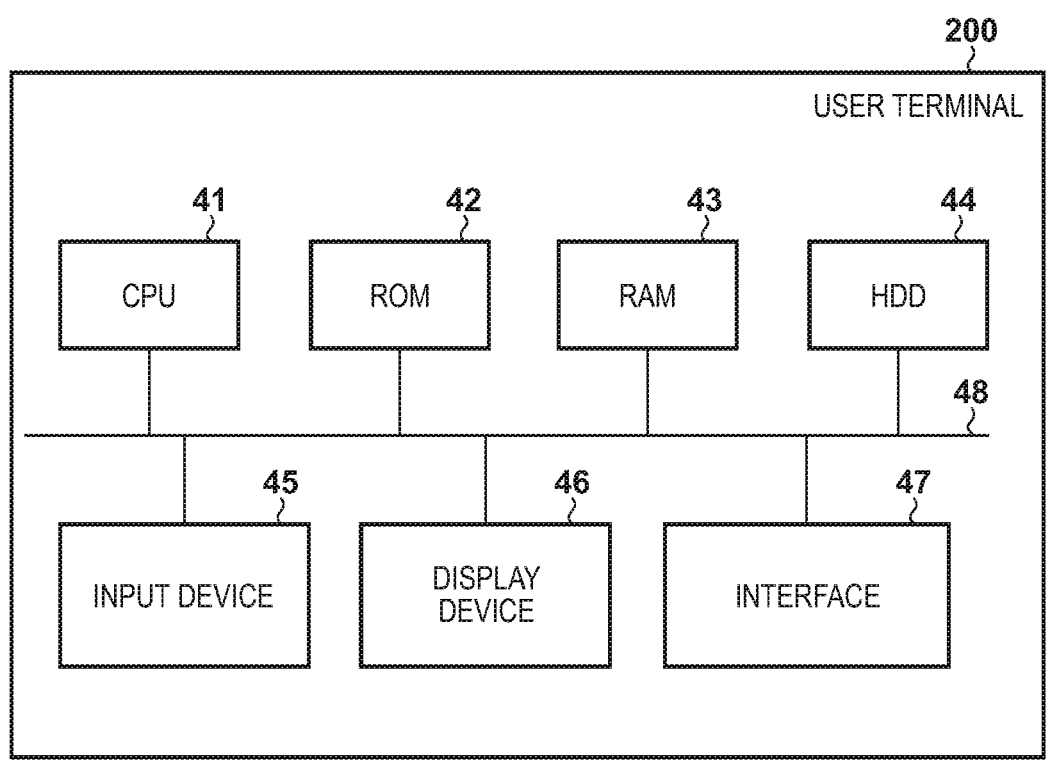
FIG. 4 is a block diagram illustrating an exemplary hardware configuration according to an embodiment.

FIG. 4 is a block diagram illustrating an exemplary hardware configuration of a computer applicable to the user terminal 200.

A CPU 41 controls the entire computer using computer programs and data stored in a ROM 42 and a RAM 43. The ROM 42 stores setting data and a boot program for the computer. The CPU 81 performs processing that will be described below as being performed by the user terminal 200.

The RAM 43 has an area for temporarily storing computer programs and data loaded from an HDD (a hard disk drive) 44 and data externally received via an interface 47. The RAM 43 further has a work area for use by the CPU 41 in performing various kinds of processing. That is, the RAM 43 can provide different areas as appropriate.

The HDD 44 stores an OS (Operating System), and computer programs and data for causing the CPU 41 to perform various kinds of processing conducted by the apparatus employing this computer. The computer programs include computer programs for causing the CPU 41 to perform processing that will be described below as being performed by the user terminal 200. The computer programs and data stored in the HDD 44 are loaded into the RAM 43 as appropriate under the control of the CPU 41 to be processed by the CPU 41. The HDD 44 also records permission settings (such as permitted domains and access tokens) for permitting cross-domain communications.

An input device 45 includes a keyboard and a mouse, and the operator of the computer can operate the input device 45 to input various instructions to the CPU 41. A display device 46 includes a CRT or liquid crystal display screen and can display the result of processing performed by the CPU 41 as graphics or text. The interface 47 includes various interfaces. For example, the interface 47 includes a network interface for connecting the computer to a network, and a device interface for connecting the image reading apparatus 100 to the computer. A bus 48 interconnects the above-described components. While the user terminal 200 is described to be a computer configured as illustrated in FIG. 4 in this embodiment for simplicity, the configuration of the computer is not limited to the illustrated configuration.

As illustrated in FIG. 2, the user terminal 200 is operated by a user and includes the browser (a web browser) 201, the Scan Server 202, and a driver 205. The user can use web applications (the web application service providing system 300 and the web storage system 400) via the browser 201 in the user terminal 200.

The Scan Server 202 includes a web server unit 203 and an image reading apparatus operation unit 204. The browser 201 communicates with the web applications (the web application service providing system 300 and the web storage system 400). The Scan Server 202 is a program (a web server program) operating in the user terminal 200 in which the browser 201 communicating with the web applications (the web application service providing system 300 and the web storage system 400) operates. The web server unit 203 of the Scan Server 202 may listen with the host name "localhost" in the user terminal 200 in order not to operate as a web server capable of name resolution from browsers in any user terminals by avoiding communication blocking by a firewall (not shown).

The Scan Server 202 provides an endpoint (the image reading apparatus operation unit 204) for performing image reading processing using the image reading apparatus 100 connected to the user terminal 200, and an endpoint (the web server unit 203) for communicating with a web system in a domain different from the domain of a web system that sends a request. Through a request to the web server unit 203, the image reading apparatus operation unit 204 can be instructed to operate the image reading apparatus 100. The image reading apparatus operation unit 204 operates the image reading apparatus 100 connected to the user terminal 200. The driver 205 is software for controlling the image reading apparatus 100.

In this embodiment, the Scan Server 202 belongs to the domain C and the web application service providing system 300 belongs to the domain A, so that they belong to different domains. Consequently, if the web application of the web application service providing system 300, operating on the browser 201 in the user terminal 200, is going to communicate with the web server unit 203 of the Scan Server 202, it will be a cross-domain request.

Therefore, when the web application of the web application service providing system 300 operating on the browser 201 communicates with the Scan Server 202, it attempts a request transmission according to the CORS standard specifications (HTTP message transmission) in order to address the cross-domain request. The HTTP messages also include requests/responses based on HTTPS communications. Here, processing of permitting the cross-domain request and enabling cross-domain communications will be specifically described with reference to FIGS. 5 and 6.

<Processing in Browser 201>

Figure 5:
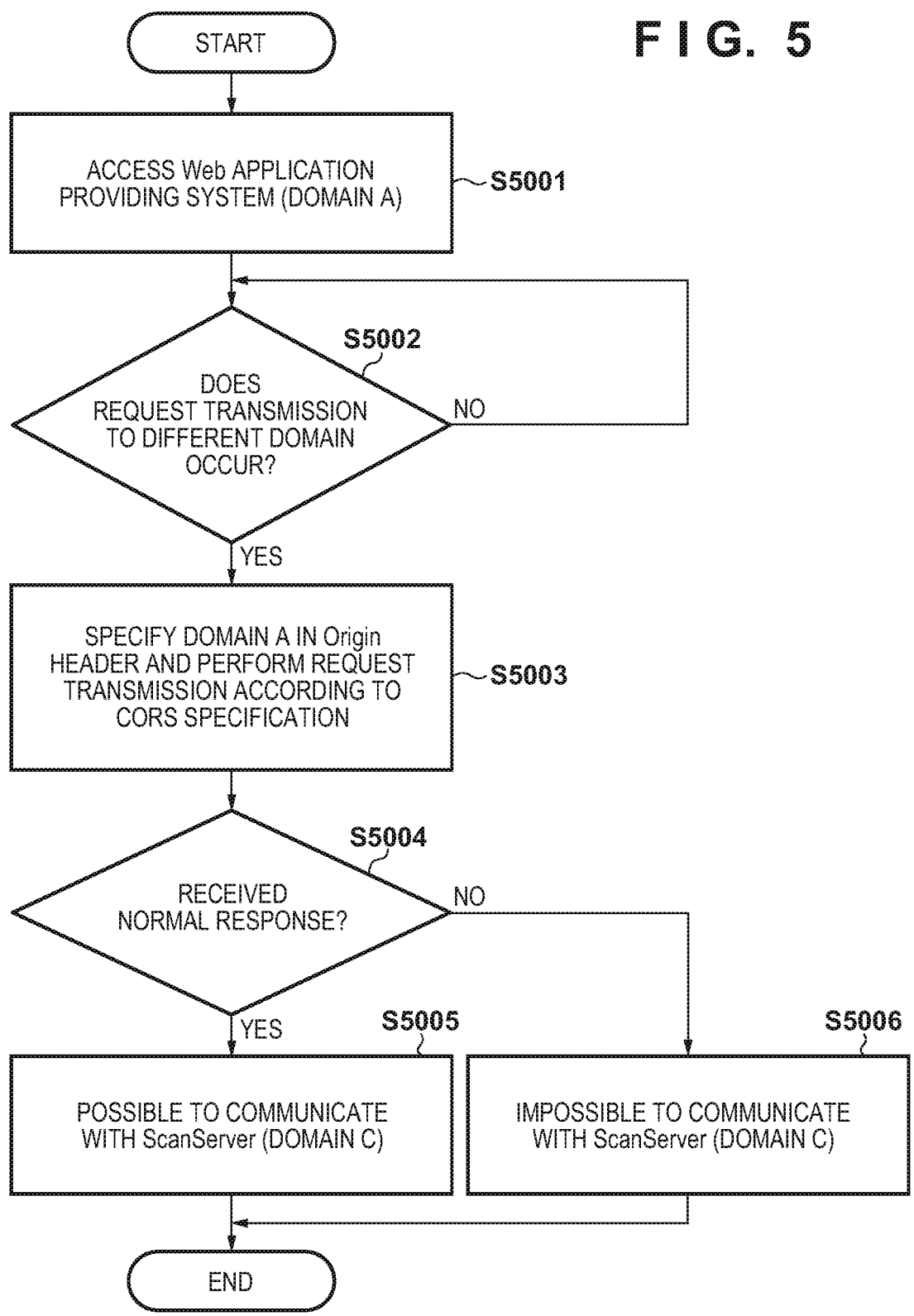
FIG. 5 is a flowchart illustrating processing in a browser 201.

FIG. 5 is a flowchart illustrating processing in the browser 201. When the user operating the user terminal 200 is a user of the web application service providing system 300, the user accesses the web application service providing system 300 via the browser 201 in the user terminal 200. The browser 201 accesses the domain of the web application service providing system 300 (domain A) (S5001).

The browser 201 determines whether or not a request transmission (HTTP message transmission) to a different domain (e.g., the domain of the Scan Server 202 (domain C)) occurs (S5002). If a request transmission to a different domain does not occur (NO in S5002), the process is repeated.

If a request transmission to a different domain (the domain of the Scan Server 202 (domain C)) occurs (YES in S5002), the browser 201 in the user terminal 200 performs a request transmission according to the CORS specifications (HTTP message transmission) to the Scan Server 202 by specifying the domain of the web application service providing system 300 (domain A) in the Origin header in the request (S5003). It is to be noted that, instead of HTTP, the request to the Scan Server 202 may be based on WebSocket or other protocols.

The browser 201 determines whether or not a normal response is received from the Scan Server 202 (S5004). A normal response is received if the domain of the web application service providing system 300 (domain A) is permitted in the Scan Server 202; otherwise, an error response is received.

If a normal response is received from the Scan Server 202 (YES in S5004), the browser 201 (the web application of the web application service providing system 300 operating on the browser 201) can communicate with the Scan Server 202 (S5005). That is, cross-domain communications (communications between the domain A and the domain C) are enabled. If an error response is received from the Scan Server 202 (NO in S5004), the browser 201 (the web application of the web application service providing system 300 operating on the browser 201) cannot communicate with the Scan Server 202.

<Processing in Scan Server 202>

Figure 6:
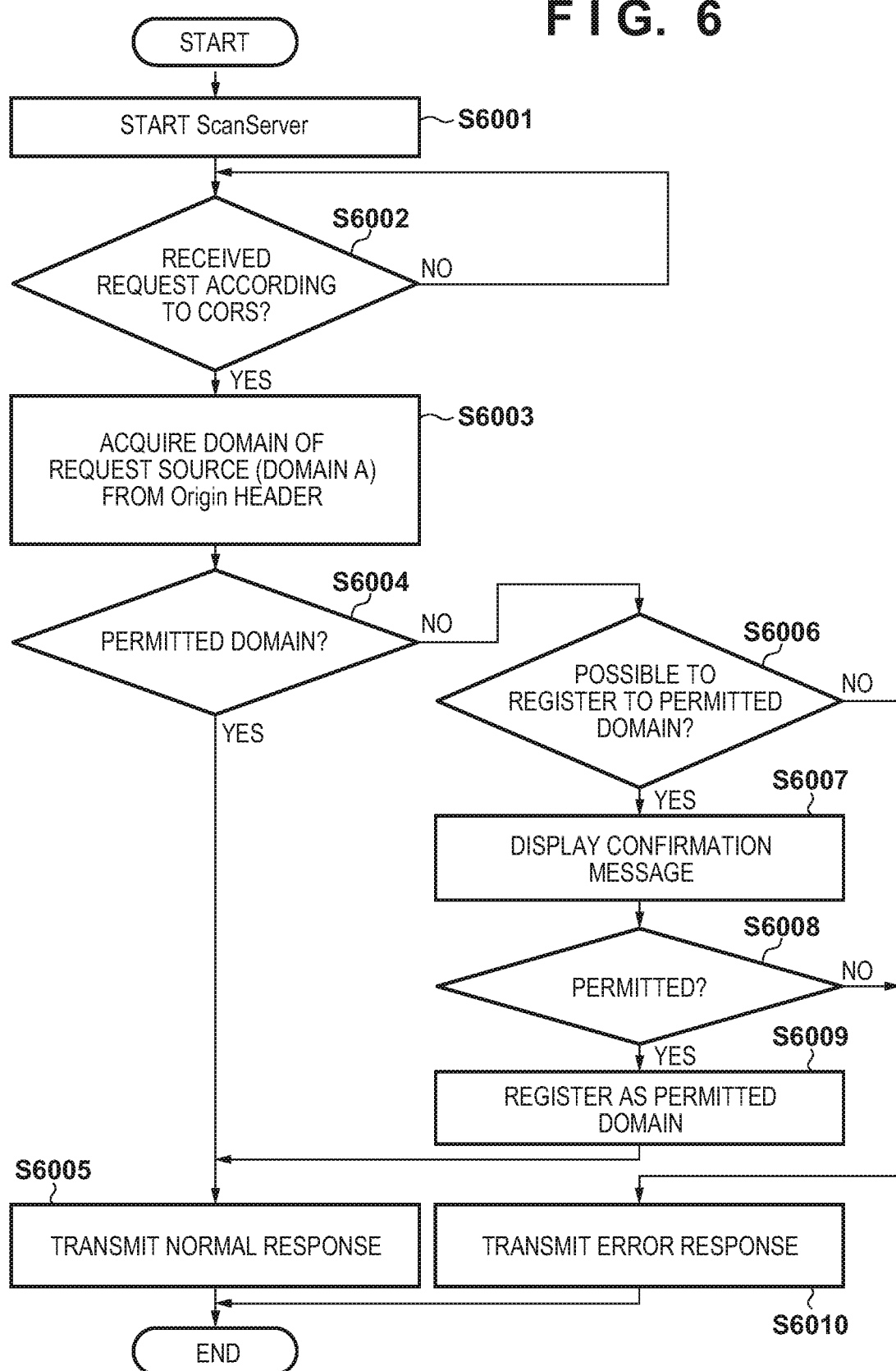
FIG. 6 is a flowchart illustrating processing in a Scan Serve 202.

FIG. 6 is a flowchart illustrating processing in the Scan Server 202. Upon started (S6001), the Scan Server 202 determines whether or not a request (an HTTP message) according to CORS is received (S6002). If it is not received (NO in S6002), the process is repeated.

If a request according to CORS is received (YES in S6002), the domain (domain A) of the request source (the browser 201) is acquired from the Origin header in the request (S6003). It is determined whether or not the acquired domain is registered as a permitted domain (whether or not it is set to be permitted) (S6004). If the domain is registered (YES in S6004), a normal response is transmitted to the domain (domain A) of the request source (the browser 201) (S6005).

If the domain is not registered as a permitted domain in the Scan Server 202 (NO in S6004), the Scan Server 202 determines whether or not the domain included in the Origin header can be registered as a permitted domain (S6006). Whether or not the domain can be registered may be determined in the following ways. For example, the maximum number of permitted domains is preset, and if the maximum number is currently not reached, the domain can be registered; if the maximum number is reached, the domain cannot be registered. In another way, impermissible domains are preset (e.g., a black list), and if the domain included in the Origin header is an impermissible domain, the domain cannot be registered; otherwise, the domain can be registered. In still another way, permissible domains are preset (e.g., a white list), and if the domain included in the Origin header is a permissible domain, the domain can be registered; otherwise, the domain cannot be registered.

Setting as a permitted domain is not necessary for each request, but may be omitted if the domain is previously registered. Determining whether or not the domain can be registered in S6006 can eliminate display of unnecessary confirmation messages to the user. If the domain cannot be registered (NO in S6006), an error response is transmitted to the domain (domain A) of the request source (the browser 201) as an operation of prohibiting the CORS-based access (S6010).

If the domain can be registered (YES in S6006), a confirmation message for CORS-setting permission is displayed on the user terminal 200 (S6007). The Scan Server 202 determines whether or not the request from the web application service providing system 300 is permitted by the user (S6008). If the request is not permitted (NO in S6008), the process proceeds to S6010.

If the request is permitted (YES in S6008), the domain (domain A) is set as a permitted domain and registered (S6009). The process then proceeds to S6005.

The processing from S6006 to S6009 may be omitted, and if the domain is not registered as a permitted domain (NO in S6004), an error response may be transmitted (S6010). Also, the processing in S6004 and S6006 may be omitted for the received request, and the confirmation message for CORS-setting permission may be displayed on the user terminal 200 (S6007). Also, the processing of determining whether or not the acquired domain is a permitted domain (S6004) may be omitted, and a normal response may be transmitted (S6005).

<Acquisition of Information Including Result of Image Reading Processing>

If the web storage system 400 is accessible with authentication information (e.g., an access token) such as of OAuth 2.0, which is an authentication protocol in conventional art, the Scan Server 202 requires an access token of the web storage system 400 when transmitting information including the result of image reading processing (read image data) to the web storage system 400 (domain B). Therefore, before starting the image reading processing, the web application of the web application service providing system 300 operating on the browser 201 in the user terminal 200 acquires the access token of the web storage system 400 via the Scan Server 202 and stores the access token.

Figure 7:
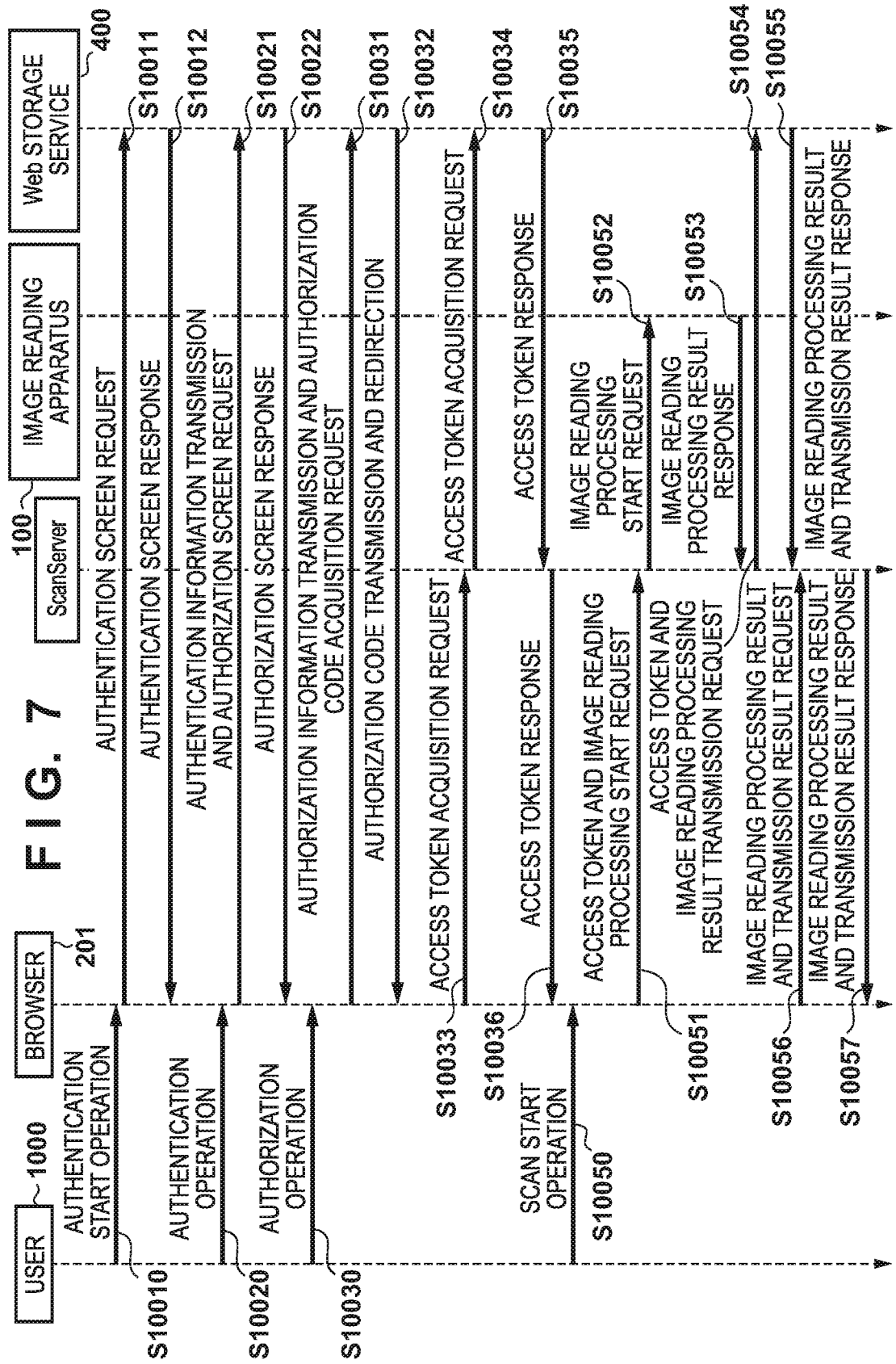
FIG. 7 is a sequence diagram illustrating an exemplary functional configuration of the system according to an embodiment.

FIG. 7 is a sequence diagram illustrating an exemplary functional configuration of the system according to an embodiment. A user 1000 instructs, via the browser 201, an operation to start authentication (S10010). The browser 201 transmits a request for an authentication screen to the web storage service 400 (S10011). The web storage service 400 transmits a response with the authentication screen to the browser 201 (S10012).

The user 1000 instructs an authentication operation via the browser 201 (S10020). The browser 201 transmits authentication information and a request for an authorization screen to the web storage service 400 (S10021). The web storage service 400 transmits a response with the authorization screen to the browser 201 (S10022).

The user 1000 instructs an authorization operation via the browser 201 (S10030). The browser 201 transmits authorization information and a request for an authorization code to the web storage service 400 (S10031). The web storage service 400 transmits the authorization code and redirection to the browser 201 (S10032). The browser 201 transmits a request for an access token to the Scan Server 202 (S10033). The Scan Server 202 transmits a request for the access token to the web storage service 400 (S10034). The web storage service 400 transmits a response with the access token to the Scan Server 202 (S10035). The Scan Server 202 transmits a response with the access token to the browser 201 (S10036). The browser 201 stores the received access token. The access token may also be stored at the Scan Server 202.

Figure 8:
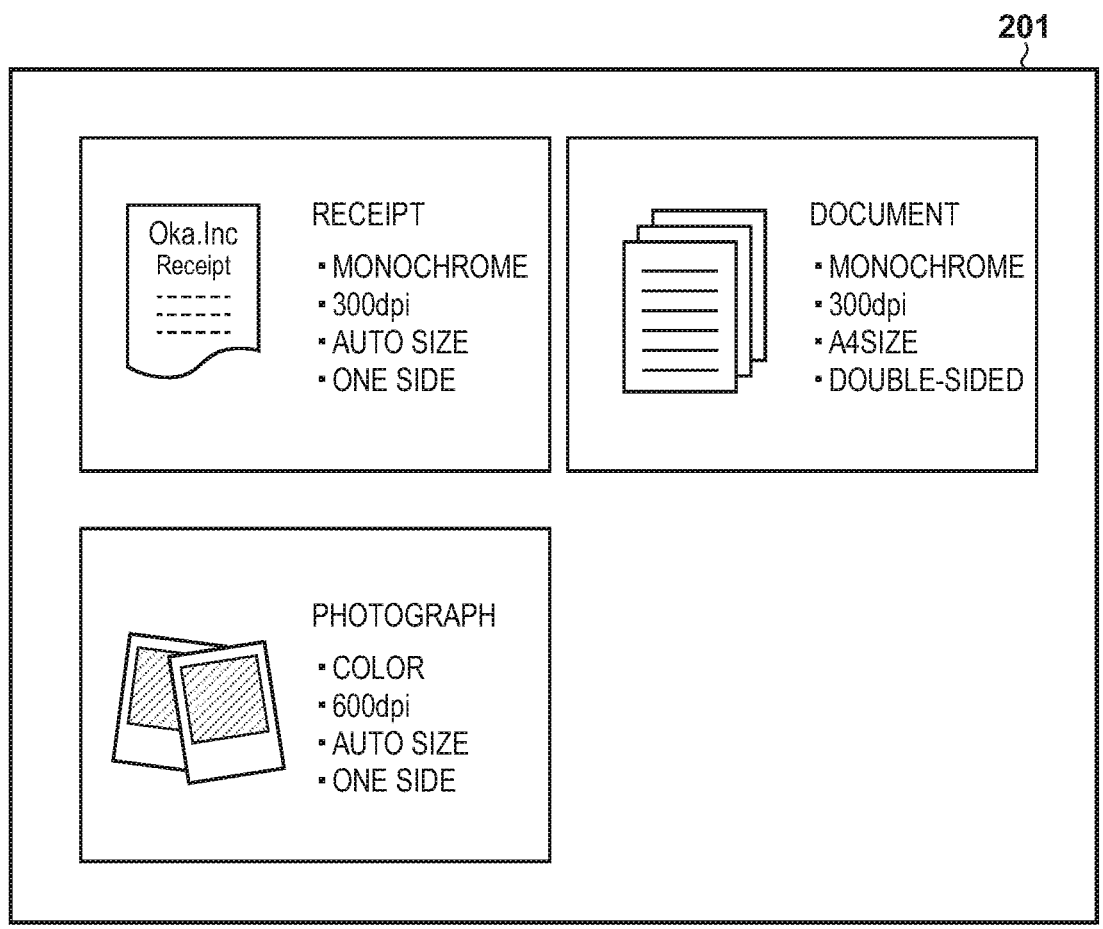
FIG. 8 is a diagram illustrating an exemplary screen displayed on the browser 201.

The user instructs, via the browser 201, image reading processing (S10050). The instruction includes information about scan settings (e.g., the storage destination, resolution, monochrome/color selection, reading size, and file format). FIG. 8 is a diagram illustrating an exemplary screen displayed on the browser 201. For example, a DOCUMENT button is selected to instruct image reading with specified scan settings (monochrome, 300 dpi, A4 size, double-sided). The web application of the web application service providing system 300 operating on the browser 201 is not limited to the illustration in FIG. 8 but may be freely customized by the user.

The web application of the web application service providing system 300 operating on the browser 201 in the user terminal 200 transmits the access token acquired in S10035, the scan setting information, and a request to start image reading processing (a request about image reading) to the Scan Server 202 (S10051). The Scan Server 202 holds the access token acquired in S10035. For exclusive use of the image reading apparatus 100, the Scan Server 202 may have a lock function by which a unique connection ID (identification information) is issued to the request source to limit the user of the apparatus.

FIG. 9 is a diagram illustrating an example in which a web application 301 of the web application service providing system 300 operating on the browser 201 in the user terminal 200 performs image reading processing using the lock function. Before starting the image reading processing with the image reading apparatus 100, the web application 301 requests the Scan Server 202 to issue a new connection ID. Once the Scan Server 202 issues a new connection ID, the Scan Server 202 rejects use of the Scan Server 202 by another application 302 having no connection ID. The image reading processing with the connection ID is started, and when the use of the image reading apparatus 100 is finished, the web application 301 transmits a disconnection request with the connection ID. Upon receiving the disconnection request, the Scan Server 202 discards the existing connection ID and returns to the state in which it waits for a request to issue a new connection ID.

If the web application 301 knowing the connection ID issued in the lock function terminates before transmitting a disconnection request with the connection ID, the Scan Server 202 remains locked and cannot issue a connection ID to the other web application 302, as in FIG. 10. To address this, the Scan Server 202 may have the ability to discard an issued connection ID after a certain time period. FIG. 11 is a diagram illustrating a process where an issued connection ID can be discarded after a certain time period. After the certain time period, an operation with the existing connection ID is rejected if a new connection ID has been issued in response to a new connection request. Here, upon reception of this new connection request, the new connection ID may be issued after the existing connection ID is discarded. However, as in FIG. 12, if a new connection request is not received even after the lapse of the certain time period and an operation request with the existing connection ID is received, the request may be accepted. The certain time period before unlocking may be specified via the web application.

The Scan Server 202 transmits the scan setting information and a request to start image reading processing to the driver 205, and the driver 205 transmits the scan setting information and the request to start image reading processing to the image reading apparatus 100 (S10052).

The image reading apparatus 100 starts driving the first to third transport units 10 to 30, as described in FIG. 1. The carrier media S stacked on the placement table 1 are transported one by one, starting with the carrier medium S at the bottom in the stack. At a time based on the result of detection by the medium detection sensor 60, the control unit 8 causes the image reading units 70 to start reading images on each carrier medium S transported by the second transport unit 20, according to the received scan setting information. The control unit 8 saves the read images in the image memory 89, performs optical text recognition processing on the saved image data, recognizes the form type, and attaches information about the form type to the image data. The control unit 8 then successively transmits the acquired image data to the driver 205. The driver 205 transmits the acquired image data to the Scan Server 202 (S10053). The carrier medium S having its images read is ejected by the third transport unit 30 onto the ejection tray 2, and the image reading processing on that carrier medium S is completed.

The image reading apparatus 100 may fail to read the carrier media S. Possible causes include that the image reading apparatus 100 is clogged with the carrier media S, and that the cover of the image reading apparatus 100 is opened to interrupt the reading. As in FIG. 13, if the image data reading fails, the image reading apparatus 100 notifies the driver 205 of the reading failure and its cause instead of transmitting image data. The driver 205 then notifies the Scan Server 202 of the image reading failure and its cause. The Scan Server 202 thus fails to perform the image reading processing and terminates without acquiring image data. Thereafter, as long as the image reading apparatus 100 is connected to the user terminal 200, the Scan Server 202 may periodically inquire of the driver 205 about the state of the image reading apparatus 100 to keep track of the possibility of starting the next image reading processing. The processing of inquiry about the state of the image reading apparatus 100 may be terminated after a certain time period or after a certain number of times of inquiry.

The Scan Server 202 transmits the access token held in the Scan Server 202 and specified by the web application of the web application service providing system 300 operating on the browser 201 in the user terminal 200, and a request to accept transmission of information including the result of the image reading processing (image data), to the web storage service 6006 in which the image data is to be stored (S10054). The information including the result of the image reading processing includes, for example, information associating the image data with the user, OCR information about the image data, and timestamps. The web storage service 6006 transmits a response to the Scan Server 202 (S10055).

The web application of the web application service providing system 300 operating on the browser 201 in the user terminal 200 then transmits, to the Scan Server 202, a request for the information including the result of the image reading processing and for the transmission result, as appropriate (S10056). The Scan Server 202 transmits a response to the browser 201 (S10057).

Thus, the web application of the web application service providing system 300 (domain A) operating on the browser 201 in the user terminal 200 can perform, only through the communications with the Scan Server 202, the image reading processing and the transmission of the information including the result of the image reading processing (the read image data) to the web storage system 400 (domain B).

If the web storage system 400 does not request an access token when the Scan Server 202 transmits the result of the image reading processing and the information, the processing of acquiring the access token (S10010 to S10036) in FIG. 7 may be omitted.

According to the exemplary embodiments, in communication for instructing the Scan Server 202 to perform image reading processing, the web application of the web application service providing system 300 operating on the browser 201 provides, to the Scan Server 202, authentication information (e.g., an access token) acquired from the web storage system 400 residing in a different domain. The Scan Server 202 can thus transmit information including the result of the image reading processing to the web storage system 400.

The request transmission from the Scan Server 202 to the web storage system 400 is not regarded as cross-domain access, because it is a communication not from the browser 201 but from a general application. Therefore, via the Scan Server 202 in the user terminal 200, the web application of the web application service providing system 300 operating on the browser 201 can transmit the information including the result of the image reading processing (the image data) acquired from the image reading apparatus 100 to the web storage system 400, without direct communications with the web storage system 400 residing in a domain different from the domain of the web application service providing system 300.

While the domain A and the domain B have been assumed to be different, they may be the same. For example, this is the case where the web application and a URL for receiving the information including the result of the image reading processing are provided in the same domain.

Other Exemplary Embodiments

The present invention may be realized by supplying a program for implementing one or more functions of the above embodiments to a system or apparatus via a network or storage medium, where one or more processors in a computer of the system or apparatus reads and executes the program. The present invention may also be realized by a circuit (e.g., ASIC) implementing the one or more functions.

The present invention is not limited to the above embodiments and various changes and modifications can be made within the spirit and scope of the present invention. Therefore, to apprise the public of the scope of the present invention, the following claims are made.

The invention claimed is:

1. An information processing apparatus comprising:
a processor and a memory;
a web browser;
a web server program, that listens with a host name as a local host, belonging to a first domain; and
a driver that communicates with a device connected to the information processing apparatus,
wherein the processor causes, by web server program, the information processing apparatus to:
receive an HTTP message from a web application that belongs to a second domain different from the first domain and is executed on the web browser;
transmit, after receiving the HTTP message, a request about the device to the driver;
receive, from the driver, information output by the device; and
transmit the information received from the driver and information used for authentication or authorization by an external apparatus connected to a network to the external apparatus, and
wherein the web server program acquires the information used for authentication or authorization from the web application via the web browser.

2. The information processing apparatus according to claim 1, wherein the device is an image reading apparatus, and the processor is further configured to cause the information processing apparatus to:
transmit a request about image reading to the driver; and
receive, from the driver, image information read by the image reading apparatus.

3. A control method in an information processing apparatus, wherein the information processing apparatus comprises:
a web browser;
a web server program, that listens with a host name as a local host, belonging to a first domain; and
a driver that communicates with a device connected to the information processing apparatus, and
in the web server program:
receiving an HTTP message from a web application that belongs to a second domain different from the first domain and is executed on the web browser;
transmitting a request about the device to the driver after receiving the HTTP message;
receiving, from the driver, information output by the device; and
transmitting the information output by the device and information used for authentication or authorization by an external apparatus connected to a network to the external apparatus and wherein the web server program acquires the information used for authentication or authorization from the web application via the web browser.

4. The control method according to claim 3, wherein the device is an image reading apparatus, and the method further comprises:
transmitting a request about image reading to the driver; and
receiving, from the driver, image information read by the image reading apparatus.

5. An information processing system comprising:
an information processing apparatus including a processor, a memory, a web browser and a web server program, that listens with a host name as a local host, belonging to a first domain; and
a device connected to the information processing apparatus, wherein the information processing apparatus comprises a driver that communicates with the device, and the processor causes, by the web server program, the information processing apparatus to:

receive an HTTP message from a web application that belongs to a second domain different from the first domain and is executed on the web browser;

transmit, after receiving the HTTP message, a request about the device to the driver;

receive, from the driver, information output by the device; and transmit the information received from the driver and information used for authentication or authorization by an external apparatus connected to a network to the external apparatus, wherein the web server program acquires the information used for authentication or authorization from the web application via the web browser.

6. The information processing system according to claim 5, wherein the device is an image reading apparatus, and the processor is further configured to cause the information processing apparatus to:

transmit a request about image reading to the driver; and receive, from the driver, image information read by the image reading apparatus.

7. A non-transitory computer-readable medium storing a web server program, that listens with a host name as a local host, that belongs to a first domain and causes a computer to:

receive an HTTP message from a web application that belongs to a second domain different from the first domain and is executed on a web browser of the computer;

transmit, after receiving the HTTP message, a request about the device to a driver that communicates with a device connected to the computer;

receive, from the driver, information output by the device; and transmit the information received from the driver and information used for authentication or authorization by an external apparatus connected to a network to the external apparatus, and wherein the web server program acquires the information used for authentication or authorization from the web application via the web browser.

8. The non-transitory computer-readable medium according to claim 7, wherein the device is an image reading apparatus, and the program further causes the computer to:

transmit a request about image reading to the driver; and receive, from the driver, image information read by the image reading apparatus.

* * * * *